(12) United States Patent
Thomsen

(10) Patent No.: US 11,433,632 B2
(45) Date of Patent: Sep. 6, 2022

(54) RELATING TO WIND TURBINE BLADE MANUFACTURE

(71) Applicant: Vestas Wind Systems A/S, Aarhus N. (DK)

(72) Inventor: Peter Frans Thomsen, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 366 days.

(21) Appl. No.: 16/619,235

(22) PCT Filed: Jun. 4, 2018

(86) PCT No.: PCT/DK2018/050122
§ 371 (c)(1),
(2) Date: Dec. 4, 2019

(87) PCT Pub. No.: WO2018/224104
PCT Pub. Date: Dec. 13, 2018

(65) Prior Publication Data
US 2020/0147912 A1 May 14, 2020

(30) Foreign Application Priority Data
Jun. 6, 2017 (DK) .......................... PA 2017 70440

(51) Int. Cl.
*B29D 99/00* (2010.01)
*B29C 31/00* (2006.01)
(Continued)

(52) U.S. Cl.
CPC ........ *B29D 99/0028* (2013.01); *B29C 31/008* (2013.01); *B29C 65/48* (2013.01);
(Continued)

(58) Field of Classification Search
CPC .............. B29D 99/0028; B29C 31/008; B29C 65/7805; B29C 65/7838; B29C 66/7212;
(Continued)

(56) References Cited

U.S. PATENT DOCUMENTS 9,188,102 B2 * 11/2015 Krishnamurthy ..... F03D 1/0675
9,932,958 B2 *  4/2018 Sandercock ............ B25B 11/00
(Continued)

FOREIGN PATENT DOCUMENTS

CN          101905538 A       12/2010
CN          104936768 A        9/2015
(Continued)

OTHER PUBLICATIONS

China National Intellectual Property Administration, First Notification of Office Action in CN Application No. 201880048864.7, dated May 20, 2021.
(Continued)

*Primary Examiner* — Ryan J. Walters
(74) *Attorney, Agent, or Firm* — Wood Herron & Evans LLP

(57) ABSTRACT

A method of making a wind turbine blade is described. The blade comprises first (12) and second (14) half shells bonded together and a shear web (16) bonded inside the shells. Prior to joining the shells together, the shear web is positioned in one of the shells. A plurality of bars (70) are attached to the shear web and engaged with a plurality of mounts (80) in order to support and stabilise the shear web relative to that shell. The shells are then arranged one above the other whilst the bars remain attached to the shear web. The bars continue to support the shear web whilst the shear web is aligned with the other shell. The bars are then detached from the shear web and the shells are brought together to bond the shells to each other and to bond the shear web between the shells.

7 Claims, 11 Drawing Sheets

(51) Int. Cl.
  *F03D 1/06* (2006.01)
  *B29C 65/78* (2006.01)
  *B29C 65/00* (2006.01)
  *B29C 65/48* (2006.01)
  *B29L 31/08* (2006.01)

(52) U.S. Cl.
  CPC ...... *B29C 65/7805* (2013.01); *B29C 65/7838* (2013.01); *B29C 65/7841* (2013.01); *B29C 66/54* (2013.01); *B29C 66/543* (2013.01); *B29C 66/636* (2013.01); *F03D 1/0675* (2013.01); *B29L 2031/085* (2013.01)

(58) Field of Classification Search
  CPC ............. B29C 65/7841; B29C 66/1122; B29C 66/1142; B29C 66/54; B29C 66/543; B29C 66/61; B29C 66/636; B29C 66/721; B29C 66/8322; B29C 65/48; F03D 1/0675; Y02E 10/72; Y02P 70/50; B29L 2031/085
  See application file for complete search history.

(56) References Cited

U.S. PATENT DOCUMENTS

| | | | |
|---|---|---|---|
| 10,864,690 B2 * | 12/2020 | Wardropper | B29D 99/0028 |
| 11,359,607 B2 * | 6/2022 | Warchol | B29D 99/0028 |
| 2015/0136305 A1 * | 5/2015 | Ullmann | B05C 5/0216 156/64 |
| 2015/0252780 A1 * | 9/2015 | Jonnalagadda | F03D 1/0675 416/226 |

FOREIGN PATENT DOCUMENTS

| | | |
|---|---|---|
| CN | 106573419 A | 4/2017 |
| CN | 104995400 B | 3/2018 |
| CN | 106573419 B | 8/2019 |
| EP | 3112670 A1 | 1/2017 |
| WO | 2014044280 A1 | 3/2014 |
| WO | 2014094780 A1 | 6/2014 |
| WO | 2017045690 A1 | 3/2017 |
| WO | 2017088890 A1 | 6/2017 |

OTHER PUBLICATIONS

European Patent Office, International Search Report and Written Opinion in PCT Application No. PCT/DK2018/050122, dated Sep. 13, 2018.

Danish Patent and Trademark Office, Search and Examination Report in PA 2017 70440, dated Nov. 29, 2017.

* cited by examiner

RELATING TO WIND TURBINE BLADE MANUFACTURE

TECHNICAL FIELD

The present invention relates generally to wind turbine blades, and more specifically to methods of making wind turbine blades and apparatus for use in such methods.

BACKGROUND

Modern wind turbine blades typically comprise a hollow shell made up of two half-shells bonded together along leading and trailing edges of the shells. One or more longitudinally-extending shear webs are provided within the internal cavity of the blade. A shear web comprises a web panel disposed between first and second mounting flanges. The mounting flanges are bonded respectively to opposed inner surfaces of the two half-shells.

The method of making the blade typically involves forming the two half shells separately from composite materials in respective half-moulds of a blade mould assembly. A two-stage join up process may be used to connect the half shells together:

In the first stage of the join-up, the shear web(s) are bonded to the inner surface of the first half shell. This stage typically involves depositing adhesive on the inner surface of the first half shell. The shear webs are then lifted into the first half shell and positioned with their first mounting flanges on top of the adhesive. The adhesive is then allowed to cure before commencing the second stage.

In the second stage of the join-up, adhesive may be applied to the upper mounting flange of the shear web and further adhesive may be applied along leading and trailing edges of the first half shell. The second half shell is then lifted, turned and positioned on top of the first half shell to complete the join-up process.

It is important that the shear webs are correctly positioned and are supported during the join-up process so that they remain in a vertical orientation (when viewed in cross-section). If the shear webs should move, e.g. tilt, even by a few degrees then this may result in misalignment of the shear web relative to the blade shell. It can be difficult and costly to rectify any such errors and in some cases the resulting blade may need to be discarded.

For blades having multiple side-by-side shear webs, it is known to connect the shear webs together during the join-up process so that the webs support one another and form a stable structure. An example of this is described in WO2014094780A1. However, this is not possible for blades having a single main web. In such cases a jig may be used to support the single web. The jig comprises a moveable framework that supports the shear web and prevents the shear web from moving relative to the blade shell during the bonding process. The jig typically supports the shear web along its entire length, which for modern utility-scale blades is often in excess of 80 metres. Accordingly, the jig is a very large, complicated and expensive item of equipment.

Whilst such jigs work well to support the shear web and produce consistent results, they have several drawbacks. Firstly, such jigs are expensive to produce and purchase. Secondly, the jigs are complex assemblies to install and configure, resulting in long lead times. Thirdly, the jigs are bespoke for a particular blade type, and it is generally not possible to use the same jig for different types or sizes of blade. Fourthly, in view of its large size, the jig occupies a significant portion of the floor space in the blade factory, where space is always at a premium.

Against this background, it is an object of the present invention to provide an alternative solution for supporting a shear web, which does not suffer from one or more of the above drawbacks of jigs.

SUMMARY OF THE INVENTION

According to a first aspect of the present invention, there is provided a method of making a wind turbine blade comprising first and second half shells and a shear web adhesively bonded between opposed inner surfaces of the half shells. The method comprises the following steps in any suitable order:

providing first and second half shells of the blade, each half shell extending in a spanwise direction between a root end and a tip end and extending in a chordwise direction between a leading edge and a trailing edge, wherein a first shear web mounting region is defined on an inner surface of the first half shell and a second shear web mounting region is defined on an inner surface of the second half shell;

providing a plurality of web flange locators in the second shear web mounting region;

providing a longitudinally-extending shear web comprising a web panel disposed between first and second mounting flanges;

providing a plurality of bars each extending between a fixed end and a free end, the fixed ends of the bars being attached to the shear web such that the bars project from the shear web in a direction transverse to the web panel;

providing a plurality of mounts respectively in a plurality of fixed locations relative to the leading and/or trailing edge of the first and/or second half shell;

arranging the shear web in the first half shell such that the first mounting flange is located in the first shear web mounting region, with adhesive being provided between the first mounting flange and the inner surface of the first half shell;

engaging the bars respectively with the plurality of mounts such that the bars support the shear web substantially vertically in the first half shell;

arranging the half shells one above the other such that one of the half shells becomes an upper half shell and the other half shell becomes a lower half shell and such that mutually opposed leading and/or trailing edges of the first and second half shells are spaced apart vertically to define a gap therebetween through which the bars extend such that the free ends of the bars are accessible outside the opposed half shells;

locating the second mounting flange of the shear web in the plurality of web flange locators, with adhesive being provided between the second mounting flange and the inner surface of the second half shell;

detaching the bars from the shear web; and lowering the upper half shell onto the lower half shell to close the gap between the two half shells and to compress the adhesive between the shear web mounting flanges and the half shells.

The method may further comprise providing a plurality of web flange locators in the first shear web mounting region and locating the first mounting flange of the shear web in these web flange locators.

The first and second half shells may be supported respectively in first and second mould halves of a blade mould assembly.

The mounts may be attached to the first or second mould half.

The bars may extend substantially horizontally between the shear web and the mounts.

The method may comprise attaching the fixed ends of the bars respectively to a plurality of plates provided on an opposite side of the web panel to the free ends of the bars.

The plurality of plates may each be connected to a cord and the method may comprise removing the plates from a cavity defined between the upper and lower half shells after the bars are detached by pulling the cord.

Alternatively, the bars may be arranged to hook on to the shear web.

According to a second aspect of the present invention, there is provided a wind turbine blade manufacturing assembly comprising:

a first half shell and a second half shell, each half shell extending in a spanwise direction between a root end and a tip end and extending in a chordwise direction between a leading edge and a trailing edge, the half shells being arranged one above the other such that a gap is defined between mutually opposed leading and/or trailing edges of the first and second half shells;

a shear web comprising a web panel disposed between first and second mounting flanges, the shear web being arranged in a cavity defined between opposed inner surfaces of the first and second half shells, the first mounting flange being aligned with a first shear web mounting region defined on the inner surface of the first half shell and the second mounting flange being aligned with a second shear web mounting region defined on the inner surface of the second half shell;

a plurality of mounts arranged outside the cavity respectively in a plurality of fixed locations relative to the opposed leading and/or trailing edges of the first and second half shells; and a plurality of bars each having a fixed end and a free end, the fixed ends of the bars being attached to the shear web and projecting from the web panel, the bars extending through the gap between the first and second half shells such that the free ends of the bars are located outside the cavity, and the bars being engaged respectively with the plurality of mounts, wherein the bars support and stabilise the shear web such that the shear web is maintained in a fixed orientation relative to the first and/or second half shell.

The assembly may comprise a first plurality of web flange locators attached to the inner surface of the first half shell in the first shear web mounting region, and/or a second plurality of web flange locators attached to the inner surface of the second half shell in the second shear web mounting region, and wherein the first mounting flange of the shear web is received in the first web flange locators and/or the second mounting flange of the shear web is received in the second web flange locators.

The assembly may further comprise a mould assembly comprising a first mould half supporting the first half shell and a second mould half supporting the second half shell.

The mounts may be attached to the mould assembly.

The assembly may comprise a plurality of plates configured to engage with the fixed ends of the bars to form an attachment to the shear web. The fixed ends of the bars form a twist lock with the respective plates. The fixed ends of the bars and the plates may be configured to clamp the shear web in between.

Alternatively, the bars may be configured to hook onto the shear web.

The invention also provides a wind turbine blade wherein the blade comprises a shear web having a plurality of attachment points for attachment to a plurality of bars.

In summary, there is provided a method and apparatus for making a wind turbine blade comprising first and second half shells bonded together and a shear web bonded inside the shells. Prior to joining the shells together, the shear web is positioned in one of the shells. A plurality of bars may be attached to the shear web and engaged with a plurality of mounts in order to support and stabilise the shear web relative to that shell. The shells may then be arranged one above the other whilst the bars remain attached to the shear web. The bars continue to support the shear web whilst the shear web is aligned with the other shell. The bars may then be detached from the shear web and the shells are brought together to bond the shells to each other and to bond the shear web between the shells.

BRIEF DESCRIPTION OF THE DRAWINGS

The invention will now be described by way of non-limiting example with reference to the accompanying figures, in which.

DETAILED DESCRIPTION

Figure 1:
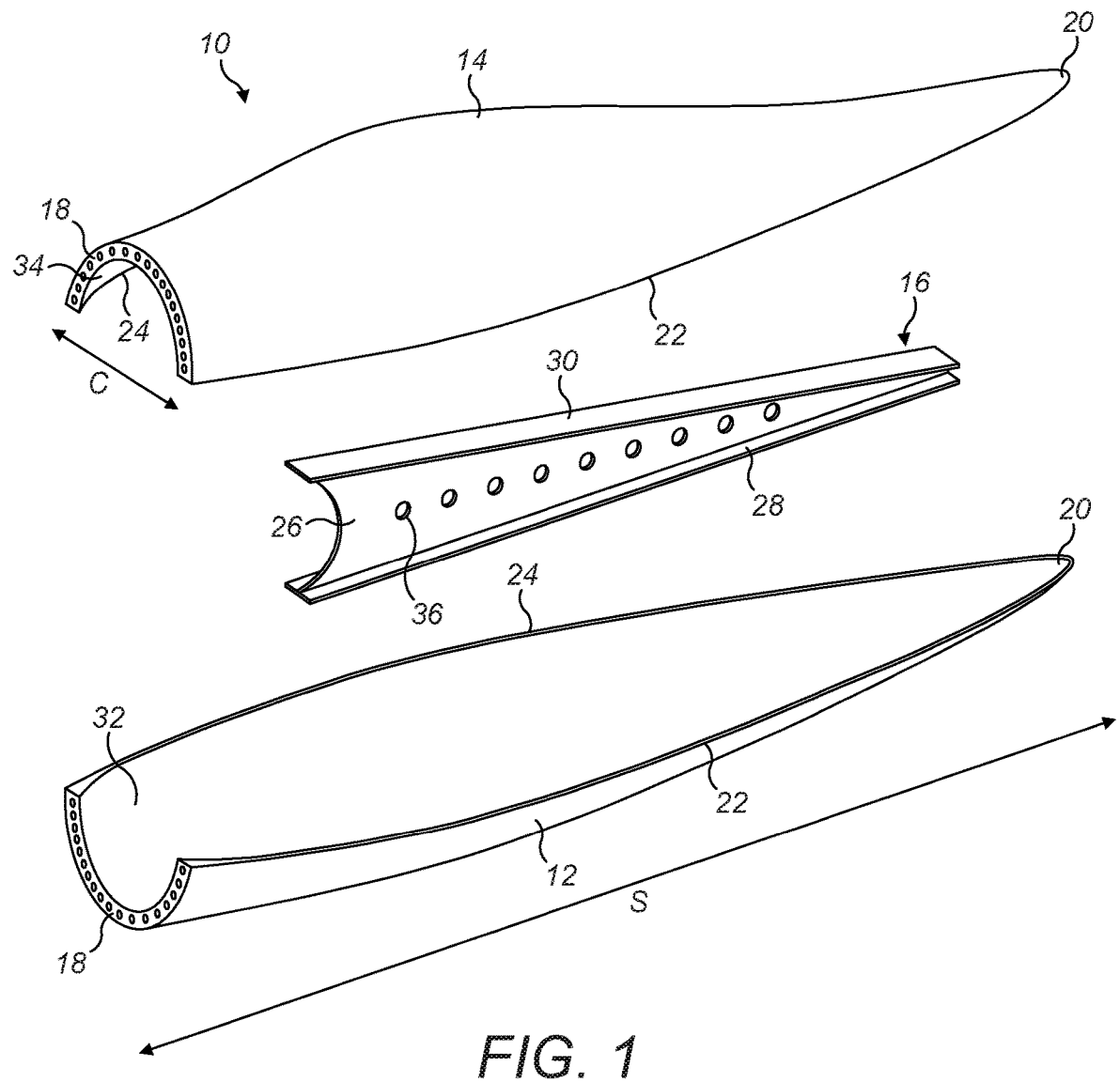
FIG. 1 is an exploded view a wind turbine blade, showing first and second half shells and a shear web.

FIG. 1 is an exploded view of a wind turbine blade 10. The blade 10 comprises an outer shell formed of first and second half shells 12, 14, e.g. a windward half shell and a leeward half shell, and a single shear web 16. The half shells 12, 14 each extend longitudinally from a root end 18 to a tip end 20 in a spanwise direction, S, and extend between a leading edge 22 and a trailing edge 24 in a chordwise direction, C.

The shear web 16 is a longitudinally-extending structure, which in the illustrated example comprises a web panel 26 disposed between first and second mounting flanges 28, 30. In the orientation of the shear web 16 shown in the figures, the first mounting flange 28 is a 'lower' mounting flange, and the second mounting flange 30 is an 'upper' mounting flange. The mounting flanges 28, 30 are arranged transversely to the web-panel 26. When the blade is assembled (as will be discussed in further detail later), the mounting flanges 28, 30 are adhesively bonded to respective inner surfaces 32, 34 of the first and second half shells 12, 14.

In this example, the shear web 16 is substantially I-shaped in cross-section. In other embodiments, the shear web 16 may have a different shape, e.g. C-shaped. Also, in this example, the shear web 16 tapers in height progressively moving from a root end to a tip end, corresponding to the tapering thickness of the blade 10 towards the tip 20.

In accordance with an embodiment of the invention, the shear web comprises a plurality of attachment points 36, the purpose of which will be discussed in detail later. The attachment points 36 in this example are in the form of holes that extend through the web panel 26. The holes 36 are mutually spaced along the length of the web panel 26. In this example, the spacing between adjacent holes 36 is approximately five metres, although any other suitable spacing may be used.

The various parts of the blade 10 are typically made from composite materials, for example glass-fibre reinforced plastic (GFRP) and/or carbon-fibre reinforced plastic (CFRP). The blade shells 12, 14 are formed in separate half moulds of a blade mould assembly, whilst the shear web 16 is generally formed in a dedicated shear web mould tool. The holes 36 in the shear web 16 may either be moulded with the shear web 16 or provided after the shear web 16 is moulded, e.g. by removal of material, such as by drilling.

Once the various parts of the blade 10 have been formed, they are then joined together in a join-up process to form the completed blade 10. This typically involves bonding the first and second half shells 12, 14 together with the shear web 16 inside the blade 10 bonded to the respective inner surfaces 32, 34 of the half shells 12, 14.

A join-up process according to an embodiment of the present invention will now be described with reference to the remaining figures.

Figure 2A:
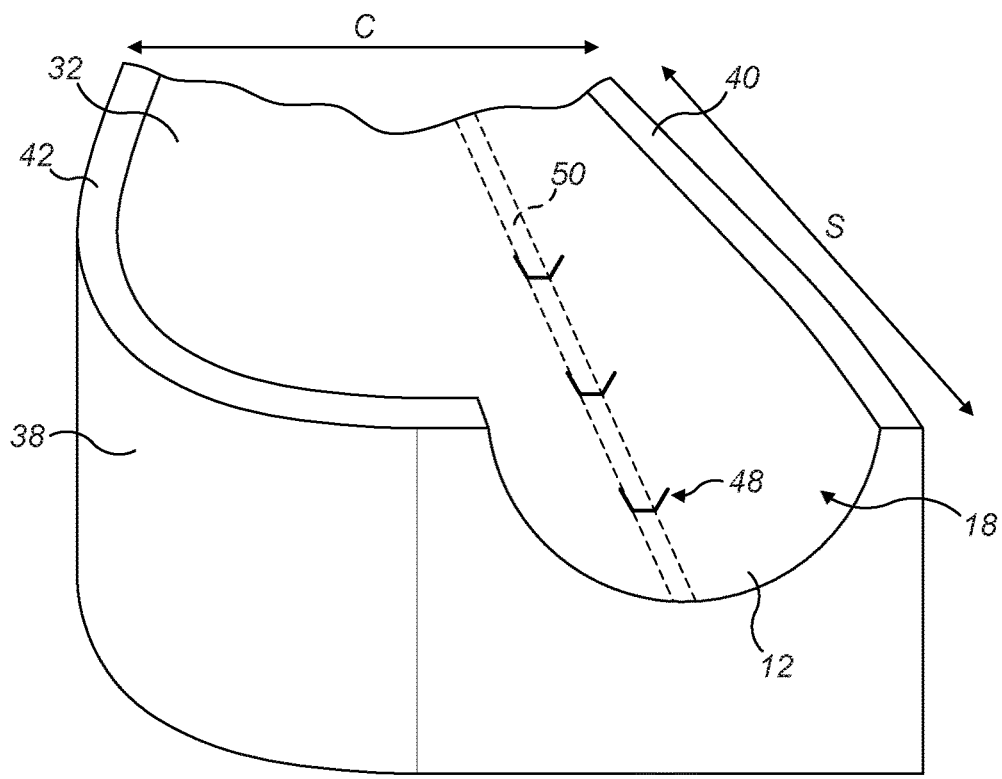
FIG. 2a shows the first half shell supported in a first half of a mould assembly.

FIG. 2a shows the first half shell 12 supported in a first half mould 38. More specifically, FIG. 2a shows an inboard portion of the first half shell 12 comprising the root end 18. The mould 38 extends longitudinally in a spanwise direction S, and transversely in a chordwise direction C between a leading edge flange 40 and a trailing edge flange 42. The first half mould 38 forms half of a blade mould assembly 46 (shown schematically in its entirety in FIG. 8).

A plurality of first web flange locators 48 are attached, e.g. bonded, to the inner surface 32 of the first half shell 12. These web flange locators 48 may alternatively be referred to as 'lower' web flange locators. The web flange locators 48 are spaced apart in the spanwise direction S in a first shear web mounting region 50 of the first half shell 12. The first shear web mounting region 50 is shown generally in FIG. 2a as the area between the dashed lines. The web flange locators 48 serve to guide and locate the first mounting flange 28 of the shear web 16 into the correct position relative to the first half shell 12. The web flange locators 48 are accurately positioned on the inner surface 32 of the blade shell 12. A laser-positioning system above the mould 38 may be used to indicate the correct positions on the surface 32 where the web flange locators 48 should be attached.

Figure 2B:
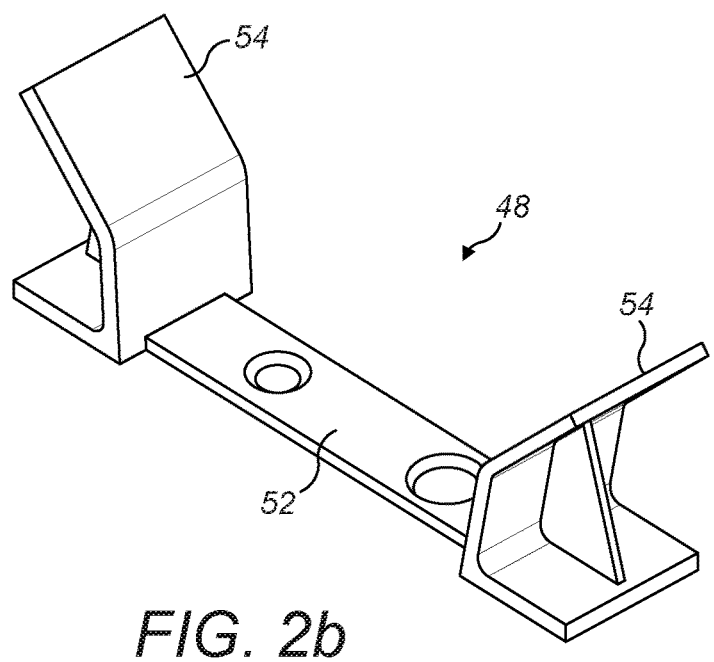
FIG. 2b is a perspective view of a web flange locator.

The web flange locators 48 are shown in more detail in FIG. 2b. In this particular example, the web flange locators 48 are generally U-shaped in cross-section, having a base 52 disposed between a pair of upstands 54. The base 52 is attached to the inner surface 32 of the shell 12, whilst the upstands 54 project from the inner surface 32 of the half shell 12. The web flange locators 48 may be configured differently in other examples. Further details of the web flange locators 48 may be found in applicant's co-pending patent application PCT/DK2016/050393, the contents of which is hereby incorporated by reference.

Figure 3:
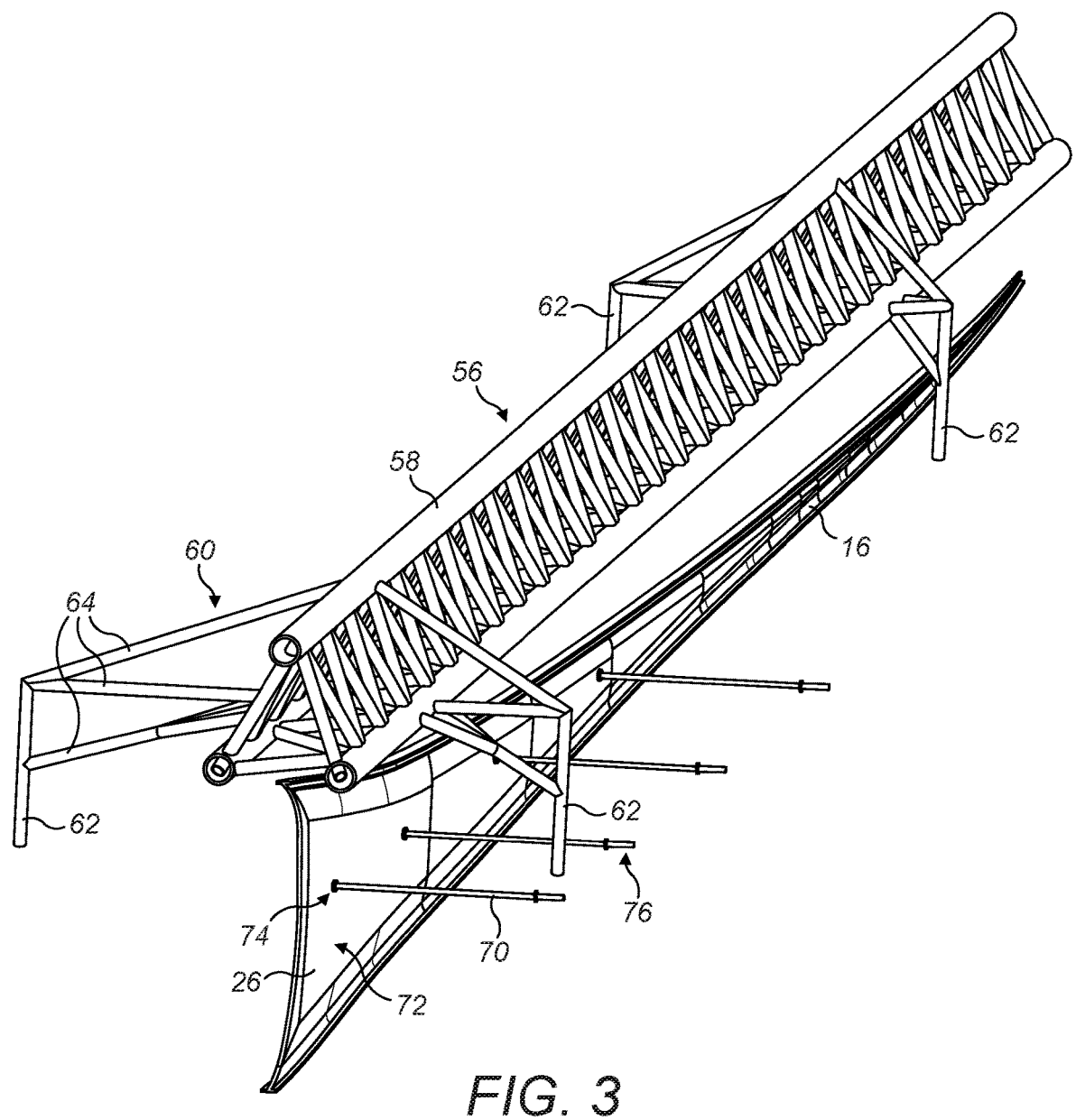
FIG. 3 shows the shear web being lifted by a lifting tool, and a plurality of horizontal bars are attached to the shear web.

Referring to FIG. 3, this shows the shear web 16 being lifted by a lifting tool 56 comprising a longitudinally-extending lifting beam 58 from which the shear web 16 is suspended. The lifting tool 56 further comprises a support framework 60 supporting the lifting beam 58. The support framework 60 comprises a plurality of vertical legs 62 arranged on both sides of the lifting beam 58, and extending below the lifting beam 58. The vertical legs 62 are connected to the lifting beam 58 by trusses 64.

In accordance with an embodiment of the present invention, a plurality of bars 70 are attached to the shear web 16. The bars 70 are in the form of rods or poles in this embodiment. Each bar 70 is attached at one of the attachment points 36 (see FIG. 1) of the shear web 16. The bars 70 are provided for supporting and stabilising the shear web 16 during assembly of the blade 10, as will be described in further detail below. When connected to the web panel 26, the bars 70 extend transversely to the plane of the web panel 26. More specifically, in this example the bars 70 are substantially perpendicular to the plane of the web panel 26. In other examples, the bars 70 may extend at any suitable angle from the web panel 26.

The bars 70 may extend from one or both sides of the web panel 26. In this example, the bars 70 extend from one side of the web panel 26, and specifically from a leading-edge side 72 of the web panel 26, i.e. the side of the web panel 26 that faces the leading edge 22 (see FIG. 1) of the blade 10.

The bars 70 each comprise a fixed end 74 and a free end 76. The fixed ends 74 are connected to the web panel 26 at the respective attachment points 36 (shown in FIG. 1). Accordingly, the bars 70 are spaced at intervals along the length of the shear web 16, corresponding to the spacing of the attachment points 36 (shown in FIG. 1). For ease of illustration, FIG. 3 only shows bars 70 attached to an inner portion of the shear web 16, however in practice the bars 70 may be attached along a greater portion of the length of the shear web 16, e.g. along the full length, or a majority of the length of the shear web 16 if required. The bars 70 are preferably attached to the web panel 26 prior to lifting the shear web 16.

In this example, the bars 70 have a substantially circular cross-section, but may have a different shape in other examples. The length of the bars 70 may be selected depending upon the size of the blade 10 and/or mould 38 and the position of the shear web 16. The length of the bars 70 may also be selected according to the spanwise location of the bars 70. For example, relatively long bars 70 may be required in the widest parts of the blade shell (e.g. close to the blade root) and shorter bars 70 may be used in narrower parts (e.g. closer to the blade tip). In this example, the longest bars may have a length of approximately 1500 mm, but bars of other suitable length may be used in other examples. Alternatively, bars 70 of equal length may be used along the shear web 16.

Whilst not shown in FIG. 3, the horizontal bars 70 may also be connected to the lifting beam 58, for example using straps, in order to support the bars 70 when the shear web 16 is lifted.

Figure 4:
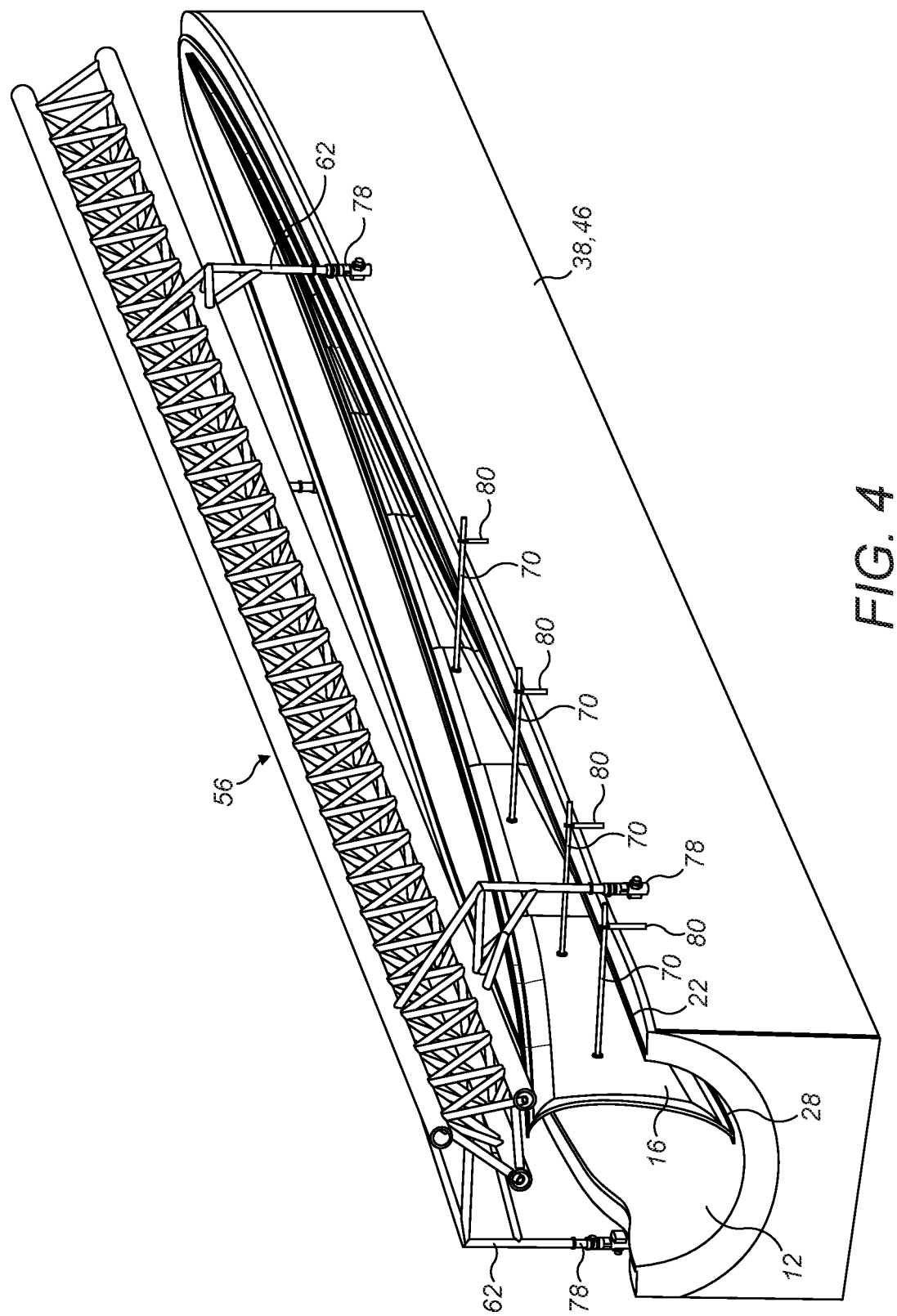
FIG. 4 shows the shear web being lowered into the first half shell.

Referring to FIG. 4, this shows the shear web 16 being positioned in the first half shell 12. The lifting tool 56 and the suspended shear web 16 are positioned above the first half shell 12 and the legs 62 of the lifting tool 56 are connected respectively to a plurality of lifting jacks 78 attached to the mould 38. The shear web 16 is lowered into the first half shell 12 using the lifting jacks 78.

Figure 5:
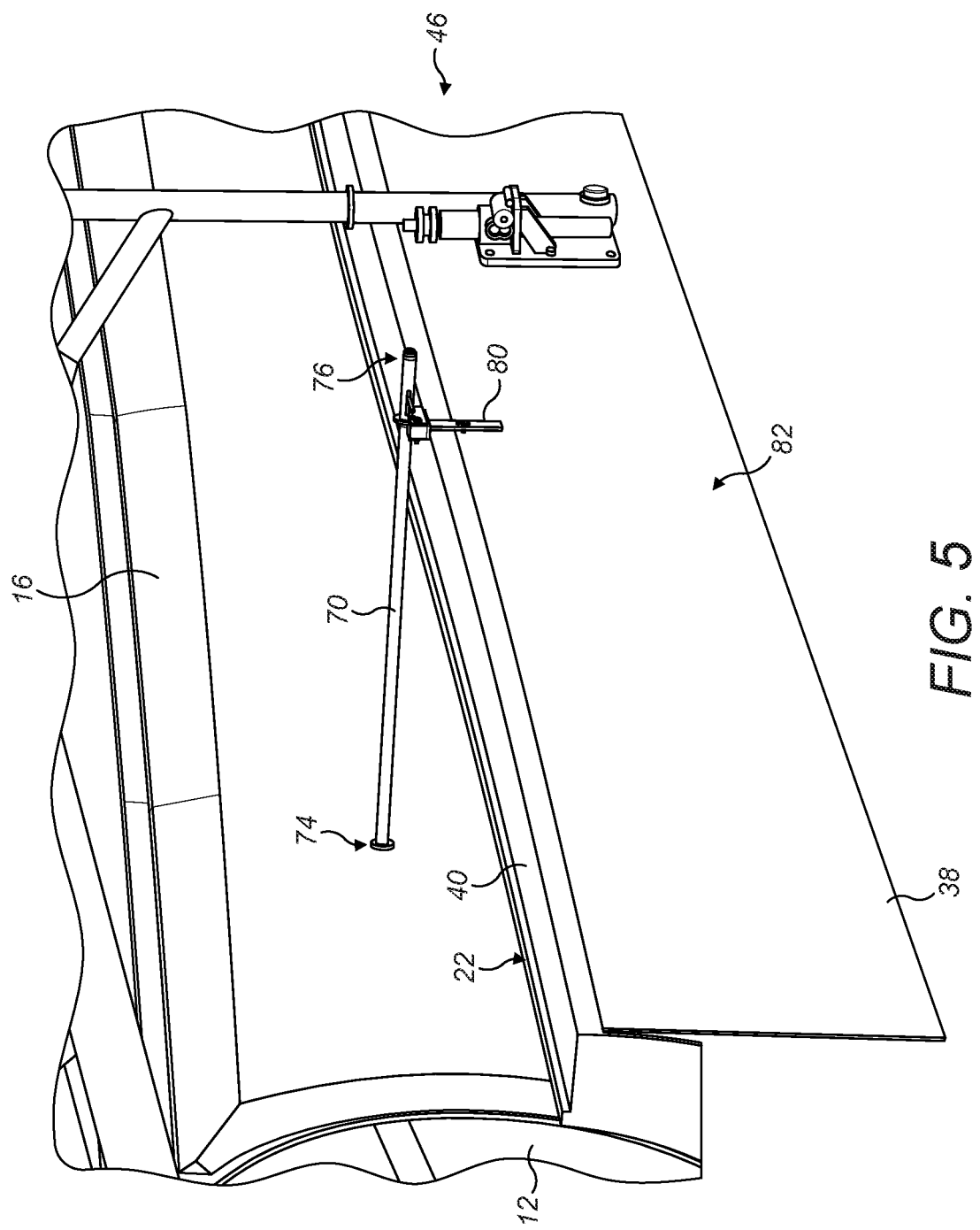
FIG. 5 shows the horizontal bars being engaged with mounts arranged near a leading edge of the first half shell.

As shown by way of example in FIG. 5, a plurality of mounts 80, one for each bar 70, are provided respectively in a plurality of fixed locations relative to the leading edge 22 of the first half shell 12. Each mount 80 may be attached to the mould assembly 46. In this example, each mount 80 is attached to a side of the mould 38. During positioning of the shear web 16 relative to the first half shell 12, the free end 76 of each bar 70 is engaged with a respective mount 80. The mounts 80 are each fixed to the mould assembly 46 at a precise location. The mounts 80 therefore act as datums and ensure the correct position of the shear web 16 relative to the half shells 12, 14 when the bars 70 are engaged with the mounts 80.

The position of the mounts 80 may be selected or adjusted during an initial 'dry fit', e.g. a trial run where the web 16 is positioned relative to the blade shells 12, 14 without application of adhesive between the shear web 16 and the blade shells. A dry fit may only be performed once during initial configuration of the mould assembly 46 to set the correct positions for the mounts 80. Dry fits are then not required for subsequent blade production runs.

In this example, the mounts 80 are attached to a leading edge side 82 of the mould 38. When the bars 70 are engaged with the mounts 80, the bars 70 extend generally horizontally from their fixed ends 74 to their free ends 76. The bars 70 extend beyond the leading edge flange 40 of the mould 38, such that the free ends 76 of the bars 70 are readily accessible to operators alongside the mould 38. The length of the bars 70 may therefore be selected accordingly.

Figure 6:
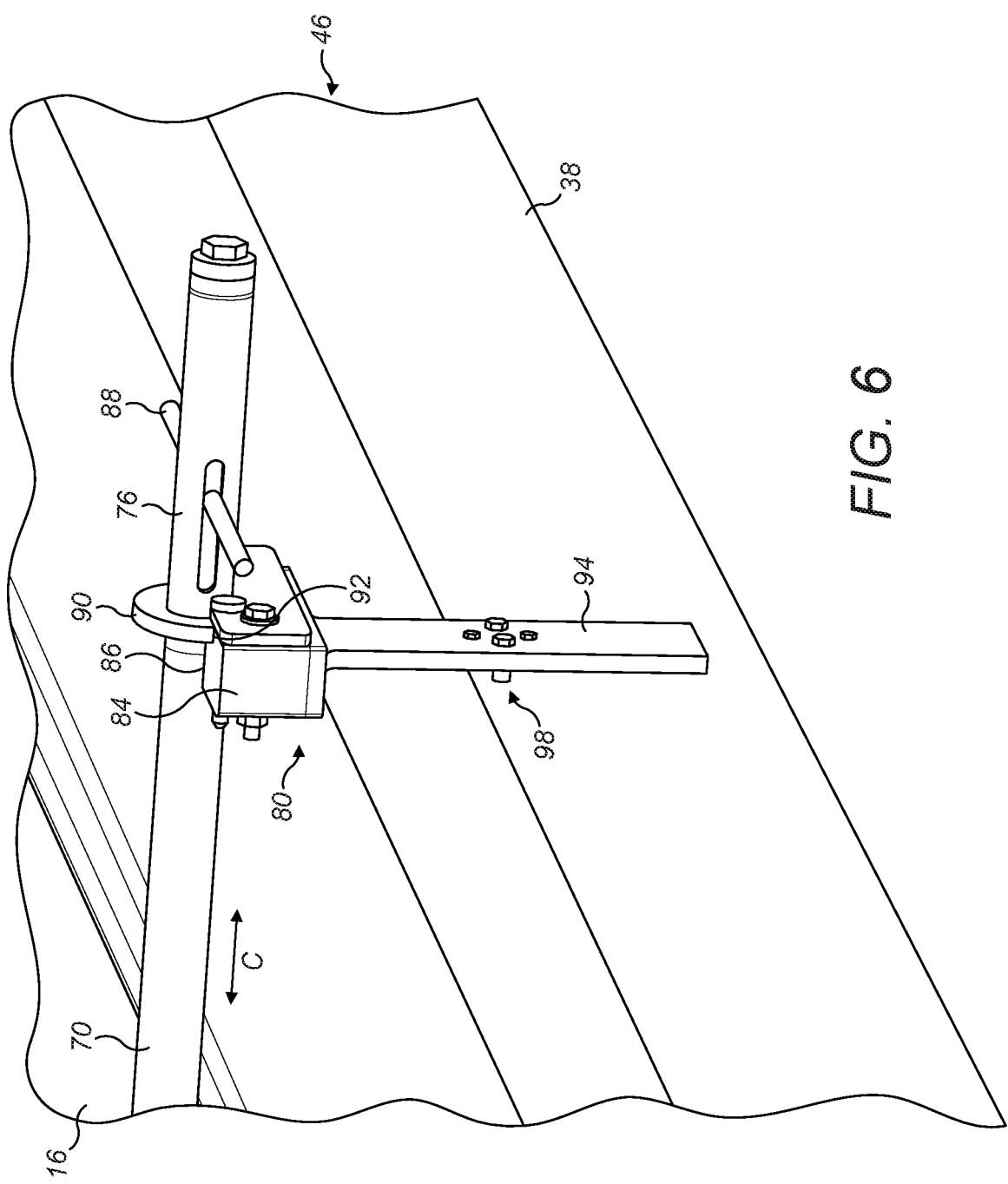
FIG. 6 is a close-up view of a bar engaged with a mount.

Referring to FIG. 6, each mount 80 comprises a support 84 for receiving and supporting the free end 76 of the bar 70. The support 84 in this example comprises a recess 86 in which the free end 76 of a bar 70 is received. The support 84 may also include a clamping portion (not shown) that may be arranged over the free end 76 of the bar 70 to lock the bar 70 to the support 84.

The free ends 76 of the bars 70 each include a handle 88 and a collar 90, in this example. The supports 80 further include a groove 92 sized to receive the collar 90 of a bar 70. With the collar 90 inserted in the groove 92, the support 80 prevents the bar 70 moving relative to the support 80 in a chordwise direction C. In other embodiments, a bearing may be provided between the bars 70 and the mounts 80. For example, an annular bearing may surround the portion of the free end 76 of the bar 70 that engages with the mount 80. The bearing may take up tolerances between the bars 70 and the mounts 80. The bearing may also facilitate rotation of the bars 70 relative to the mounts 80 during detachment of the bars 70 from the shear web 16, as discussed in further detail later with reference to FIGS. 12 and 13.

The mounts 80 may further include a bracket 94 that couples the support 84 to the mould assembly 46. The bracket 94 in this example comprises an elongate steel profile of rectangular cross-section. The steel profile 94 provides the mounts 80 with built-in flexibility. The steel profile 94 is able to bend or flex slightly, ensuring that the shear web 16 does not become over-constrained when the bars 70 are supported in the mounts 80.

Referring again to FIG. 4, when the shear web 16 is lowered into the first half shell 12, the bars 70 may be used to facilitate positioning of the shear web 16. For example, operators may pull or push on the bars 70 (if required) as the shear web 16 is lowered to align the shear web 16 above the lower web flange locators 48 (shown in FIG. 2a). Once aligned above the web flange locators 48, the lifting jacks 78 may be operated to lower the shear web 16 into position relative to the first half shell 12. The shear web 16 is lowered into the web flange locators 78, which guide the lower mounting flange 28 of the shear web 16 towards the first shear web mounting region 50 (shown in FIG. 2a).

Figure 7:
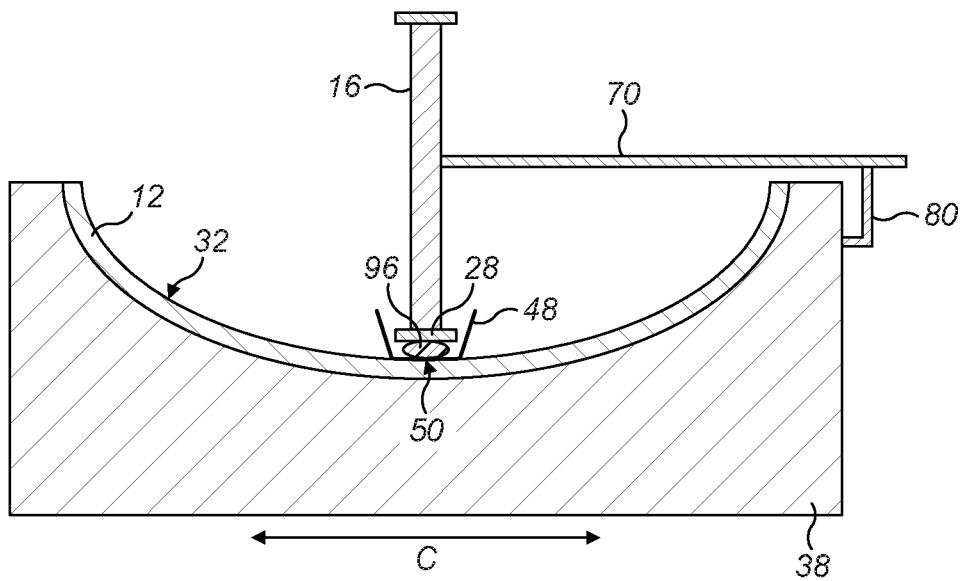
FIG. 7 is a simplified cross-sectional view through the mould, showing the shear web inside the first half shell after removal of the lifting tool, with the shear web being supported in a vertical position by the horizontal bars.

Referring now to FIG. 7, which is a simplified cross-sectional view through the mould 38, this shows the lower mounting flange 28 of the shear web 16 inserted into the lower web flange locators 48. A line or bead of adhesive 96 can also be seen between the mounting flange 28 and the inner surface 32 of the first half shell 12 in the first shear web mounting region 50. This adhesive extends along the first shear web mounting region 50 (shown in FIG. 2a), including inside the web flange locators 48. With the shear web 16 lowered into the required position, the bars 70 may be engaged with their respective mounts 80. The overhead lifting tool 56 (shown in FIG. 4) may then be removed from the shear web 16.

With the lifting tool 56 removed, the bars 70 serve to support the shear web 16 upright in the first half shell 12 and prevent the shear web 16 from moving out of position. Specifically, as shown, the bars 70 support the shear web 16 in a substantially vertical orientation in the first half shell 12. The engagement between the bars 70 and the mounts 80 prevents the bars 70 from moving in a chordwise direction C relative to the mounts 80. This is achieved in this example by the collars 90 at the free ends 76 of the bars 70 being seated in the grooves 92 in the mounts 80 (see FIG. 6). The bars 70 therefore prevent the shear web 16 from tilting away from the vertical.

The vertical orientation of the shear web 16 may be checked by operators using a digital level, if required. If the shear web 16 is not precisely vertical, then the mounts 80 may be adjusted to bring the shear web 16 into the correct orientation. To this end, the mounts 80 may comprise adjustment means 98, such as a bolt extending through the brackets 94 (see FIG. 6), which can be turned to move the support 84 slightly in the chordwise direction C to fine-tune the vertical orientation of the shear web 16. Other suitable adjustment means could alternatively be used.

Figure 8:
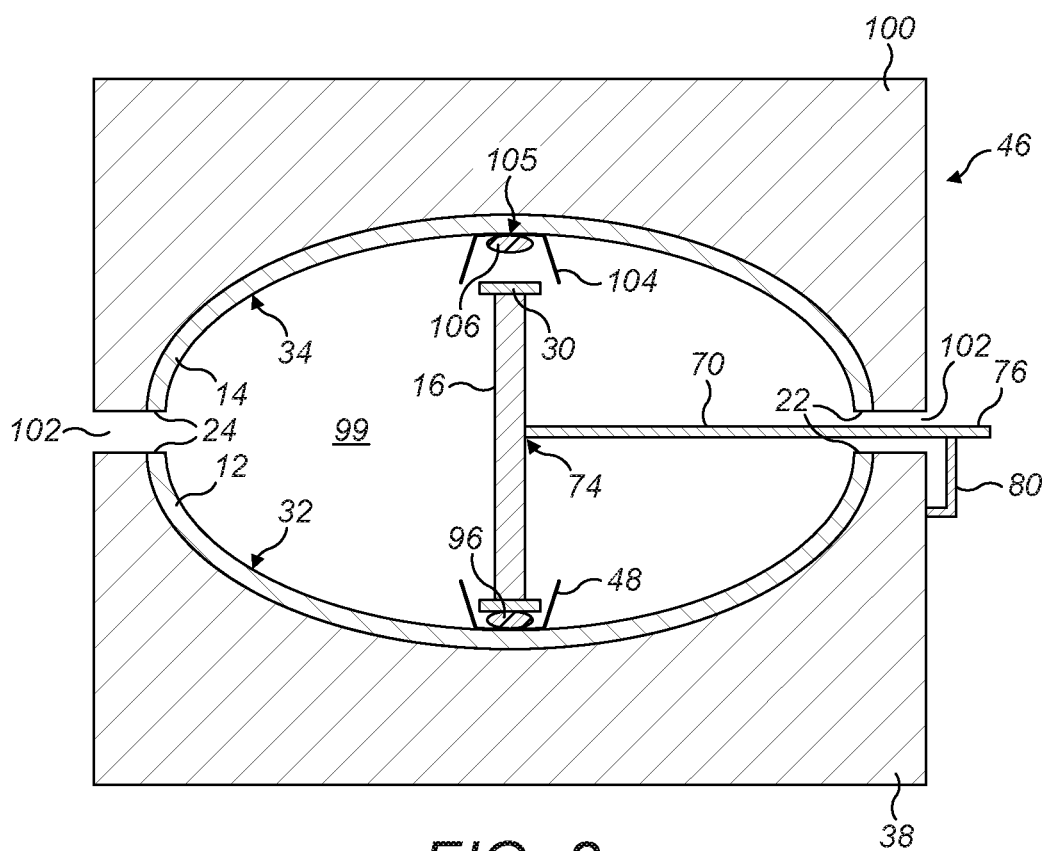
FIG. 8 is a simplified cross-sectional view showing a second half of the mould assembly supporting the second half shell arranged above the first half of the mould assembly.

Referring now to FIG. 8, with the shear web 16 supported by the bars 70, the first and second half shells 12, 14 of the blade 10 may be arranged one above the other such that one of the half shells becomes an upper half shell and the other half shell becomes a lower half shell. In this example, the first half shell 12 is the lower half shell, and the second half shell 14 is the upper half shell. As shown in FIG. 8, a cavity 99 is defined between the opposed inner surfaces 32, 34 of the half shells 12, 14. The shear web 16 is located within this cavity 90.

The arrangement of the half shells 12, 14 shown in FIG. 8 may be achieved, for example, by lifting and turning the second mould half 100 of the mould assembly 46 and positioning it above the first mould half 38. The second mould half 100 supports the second half shell 14. This procedure may be referred to generally as 'closing the mould'.

The mould assembly 46 is in a partially closed configuration in FIG. 8, i.e. the second half shell 14 and the second mould half 100 are supported slightly above the first half shell 12 and the first mould half 38 such that a gap 102 is defined between the opposed half shells 12, 14 and mould halves 38, 100. More specifically, the gap 102 is defined between mutually opposed leading and trailing edges 22, 24 of the first and second half shells 12, 14. As shown in FIG. 8, the bars extend through this gap 102 such that the free ends 76 of the bars 70 are located outside the cavity 99 and remain accessible to operators alongside the mould assembly 46. The fixed ends 74 of the bars 70 are therefore inside the cavity 99, whilst the free ends 76 of the bars 70 are outside the cavity 99.

A plurality of second web flange locators 104 are attached e.g. bonded to the inner surface 34 of the second half shell 14 in a second shear web mounting region 105 defined on the inner surface 34 of the second half shell 12. The second web flange locators 104 may alternatively be referred to as 'upper' web flange locators 104. The upper web flange locators 104 may be identical or different to the lower web flange locators 48. A bead of adhesive 106 is provided along the second shear web mounting region 105, including inside the upper web flange locators 104. The upper mounting flange 30 of the shear web 16 is aligned directly beneath the upper web flange locators 104.

Figure 9:
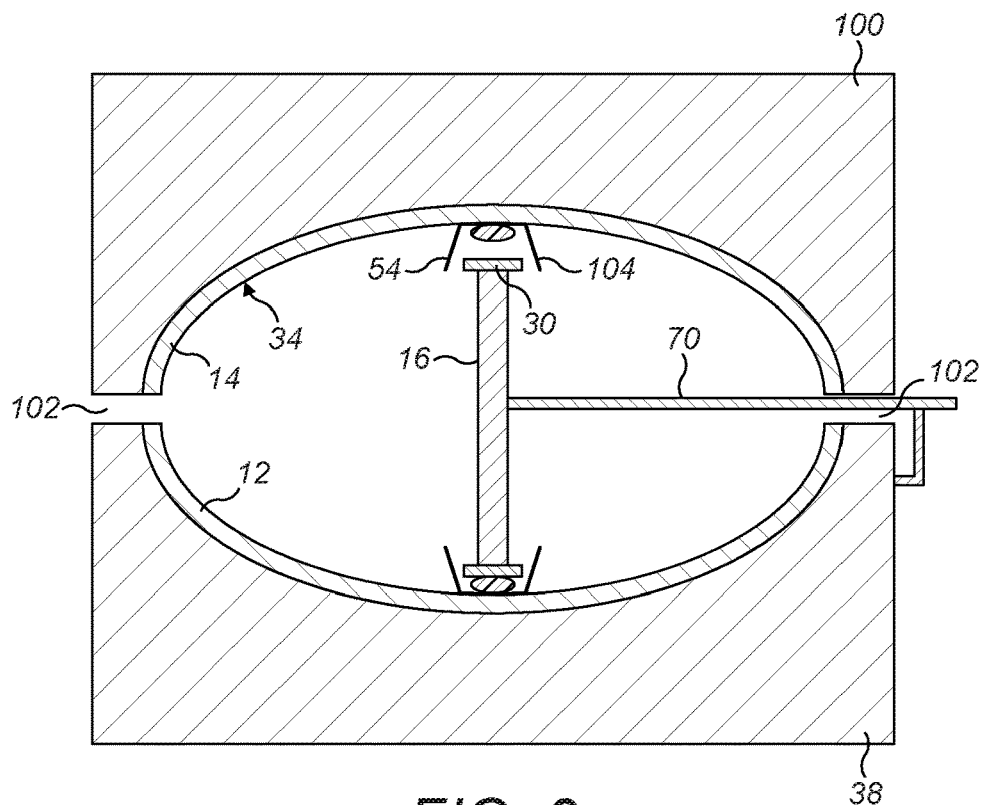
FIG. 9 corresponds to FIG. 8 after the second half of the mould assembly is lowered slightly so that the shear web is inserted into web flange locators of the second half shell.

Referring to FIG. 9, this shows the blade manufacturing assembly after the upper half mould 100 and upper half shell 14 have been lowered further towards the lower half mould 38 and lower half shell 12. As shown, the upper mounting flange 30 of the shear web 16 is now partially inserted into the upper web flange locators 104. The upstands 54 of the web flange locators 104 project sufficiently from the inner surface 34 of the second half shell 14 to ensure that the upper flange 30 of the shear web 16 is located in these guides 104 before a final descent of the upper mould half 100, i.e. before the upper half shell 14 is lowered completely onto the lower half shell 12.

Figure 10:
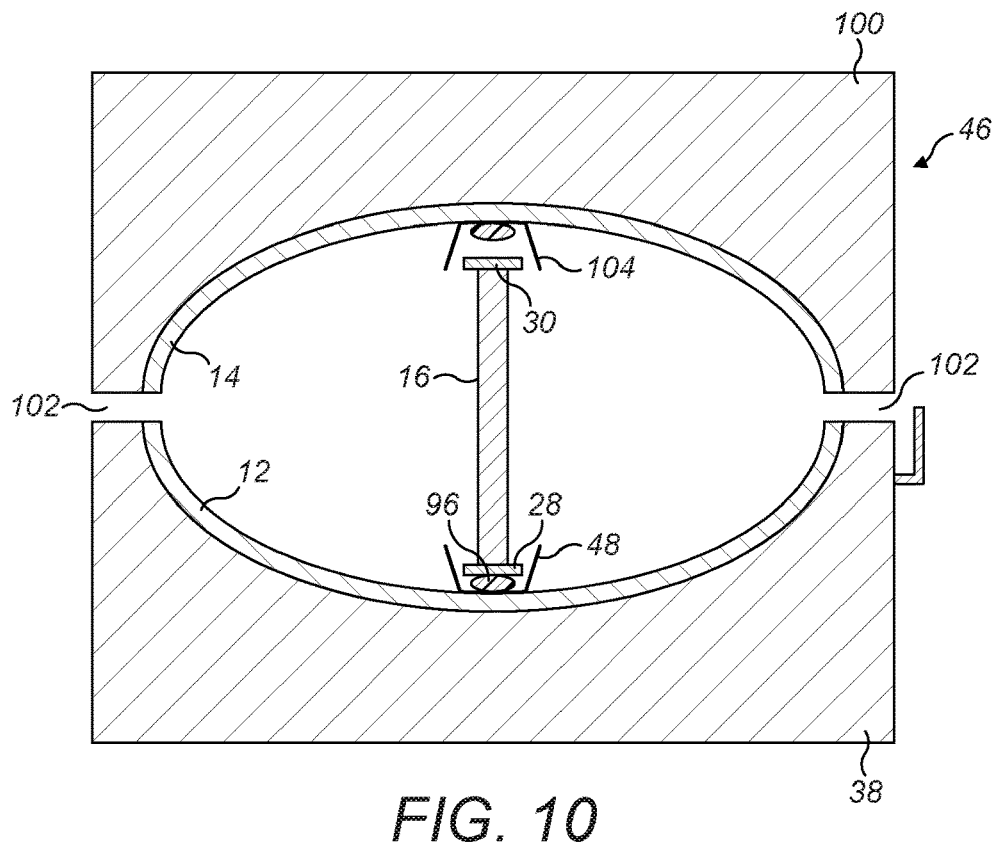
FIG. 10 corresponds to FIG. 9 after removal of the bars from the shear web.

Referring now to FIG. 10, with the upper mounting flange 30 of the shear web 16 received within the upper web flange locators 104, the bars 70 may be detached from the shear web 16. With the bars 70 removed, the shear web 16 is supported by the web flange locators 48, 104 above and below the shear web 16, which maintain the shear web 16 in the correct position and prevent the shear web 16 from tilting or otherwise moving out of the position. In other embodiments, the lower web flange locators 48 may not be required, as the upper flange locators 104 may be sufficient to prevent the shear web 16 from moving out of position once the bars 70 are detached; the lower mounting flange 28 may be maintained in position by virtue of the tackiness of the adhesive 96.

Figure 11:
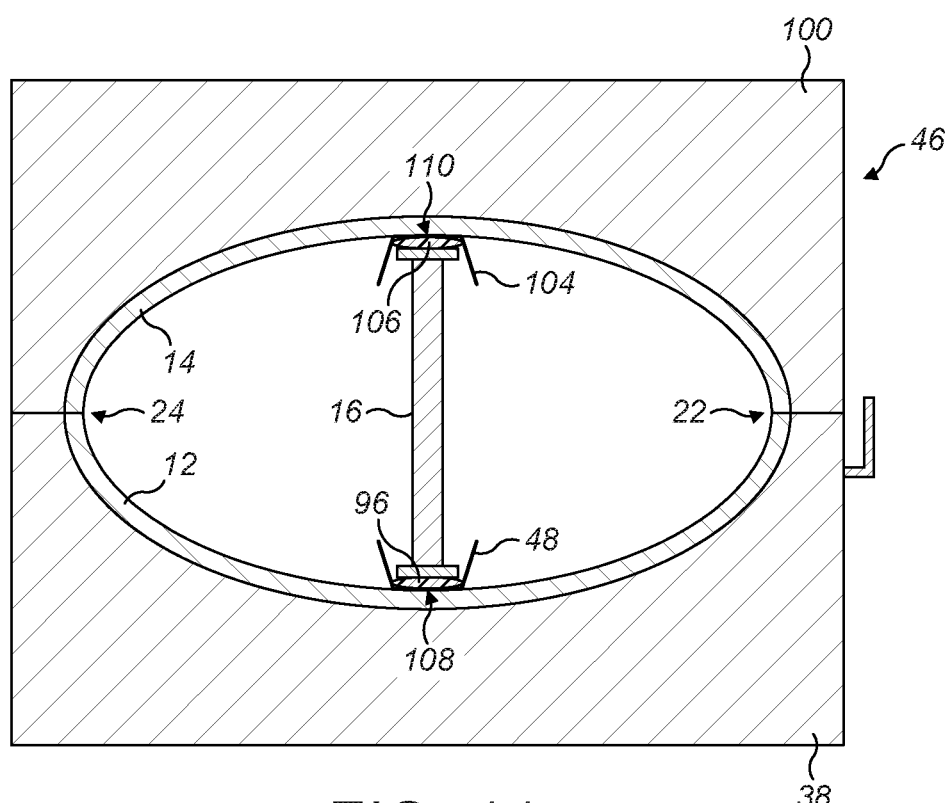
FIG. 11 is a simplified cross-sectional view showing the mould assembly in a fully closed position.

After removal of the bars 70, the final descent of the upper mould half 100 and upper half shell 14 may commence to fully close the mould assembly 46 and compress the adhesive 96, 106 used to bond the various components together as shown in FIG. 11.

Referring to FIG. 11, this shows the mould assembly 46 in a fully closed position, in which the first and second half shells 12, 14 are brought into contact and the gap 102 shown in FIGS. 8-10 is eliminated. During the final descent of the second mould half 100, the combined weight of the second mould half 100 and the second half shell 14 acts on the shear web 16 and on the lower half shell 12 causing compression of the adhesive 96, 106 below and above the shear web 16 to form respective first and second shear web bond lines 108, 110 with the respective half shells 12, 14. The web flange locators 48, 104 serve to support and guide the shear web 16 into the correct position relative to the blade shells 12, 14 during this final stage.

Whilst not shown in the figures, adhesive may also be provided between the opposed leading edges 22 and opposed trailing edges 24 of the respective half shells 12, 14. This adhesive may also be compressed during the final descent of the upper mould 100 and upper half shell 14 to form leading- and trailing-edge bond lines between the two half shells 12, 14. The adhesive in the various bond lines is therefore compressed simultaneously during this final descent. The adhesive is then cured. Heating may be applied to increase the rate of curing, if required.

The join-up process described above is known as a one-stage join-up, since it involves simultaneous compression of the adhesive 96, 106 above and below the shear web 16, i.e. in the first and second shear web bond lines 108, 110. In other words, the one-stage join-up involves simultaneously bonding the shear web 16 to both the upper and lower half shells 14, 12 in a single step.

This is in contrast to the two-stage join-up described by way of background, whereby the shear web 16 is first bonded to the lower half shell 12 before subsequently being bonded to the upper half shell 14. A one-stage join up is particularly advantageous since it reduces the takt time of the blade production process in comparison to a two-stage join up, where the adhesive 96 between the shear web 16 and first half shell 12 must first be allowed time to cure before the mould assembly 46 can be closed.

The use of bars 70 to support the shear web 16 advantageously avoids the need for a jig, such as the large and expensive jigs presently used and described by way of background. A one-stage join up is not possible when using a jig, since the mould 46 cannot be closed whilst the jig is supporting the shear web 16. The bars 70 make a one-stage join-up possible because they allow the mould 46 to be substantially closed when the bars are supporting the shear web 16. Accordingly, the shear web can be accurately positioned relative to both the first and second half shells 12, 14 before compression of adhesive 96, 106 takes place.

The bars 70 ensure the shear web 16 is correctly positioned during mould closure and aligned with the web flange locators 48, 104. Once the shear web 16 is located in the web flange locators 48, 104 the bars 70 can then be removed. With the bars 70 removed the shear web 16 is unconstrained during the bonding process, and thus free and able to adopt its correct position within the web flange locators 48, 104. This ensures consistent and accurate bond lines 108, 110 both above and below the shear web 16 in accordance with design specifications.

It has already been discussed above that the bars 70 are releasably attached to the shear web 16. The process of attaching and detaching the bars 70, in accordance with a particular example, will now be discussed in further detail with reference to FIGS. 12 and 13.

Figure 12:
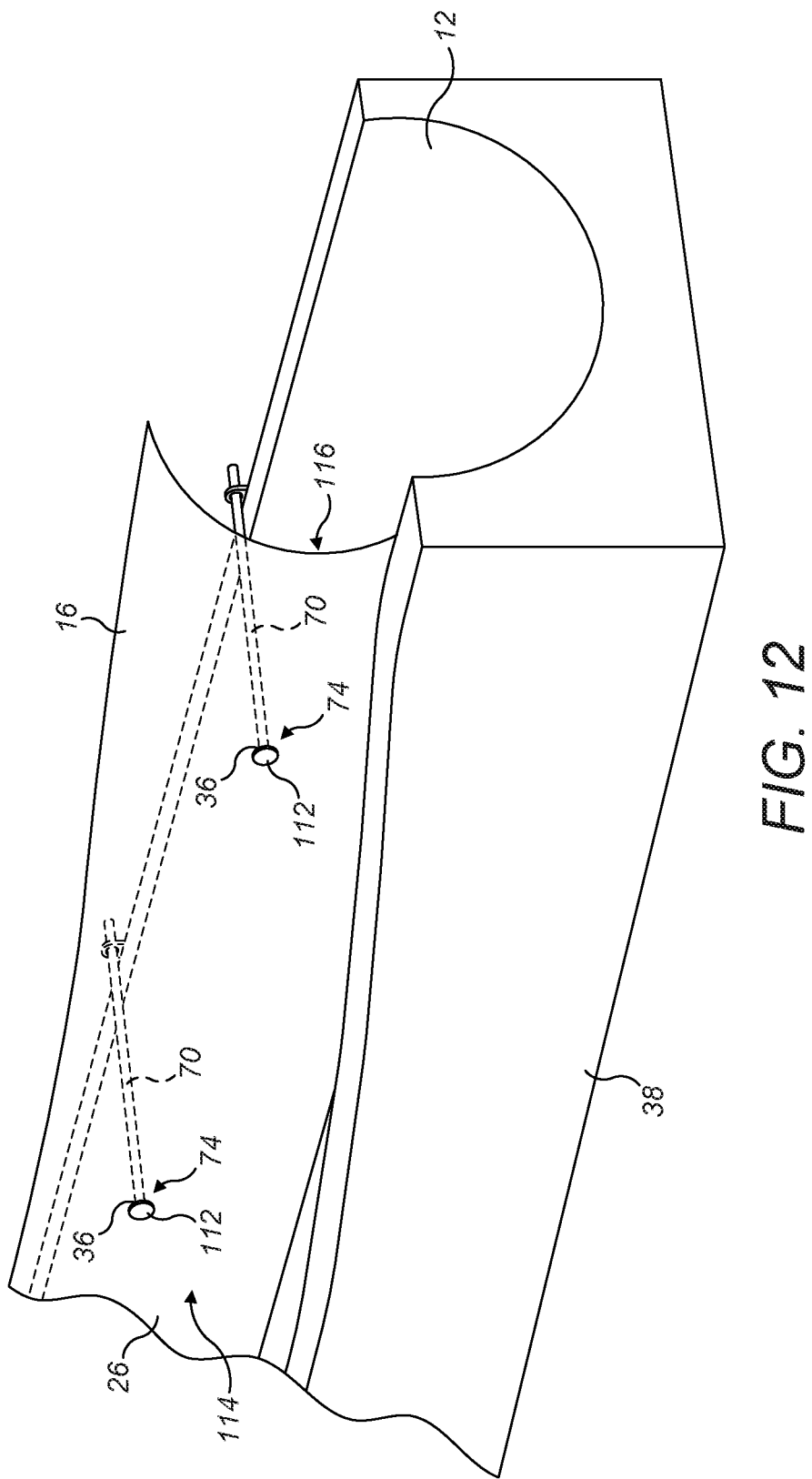
FIG. 12 shows plates positioned at attachment points for the bars on an opposite side of the shear web to the bars.

Referring to FIG. 12, the bars 70 may be attached to the shear web 16 via a releasable locking mechanism. In this example, the bars 70 are connected to the shear web 16 via a twist lock. As shown in FIG. 12, the fixed end 74 of each bar 70 connects to a respective plate 112 provided on the opposite side of the shear web 16 to the bars 70. Accordingly, in this example, the plates 112 are located on a trailing-edge side 114 of the shear web 16. The plates 112 in this example are made from metal, for example steel. The plates 112 may be casted or moulded or formed by any other method.

As already mentioned in relation to FIG. 1, the shear web 16 may comprise a plurality of attachment points 36, for example in the form of a plurality of holes in the web panel 26 (as shown in FIG. 1). These holes 36 are provided at the locations where the bars 70 will be attached. In one embodiment, the plates 112 may be fixed to the trailing-edge side 114 of the shear web 16 respectively at the locations of these attachment points 36. To attach the bars 70 to the shear web 16, the fixed end 74 of a bar 70 may be inserted through a hole 36 (from the leading-edge side 116 of the shear web 16) such that it engages with a plate 112 on the trailing-edge side 114 of the web 16.

Figure 13:
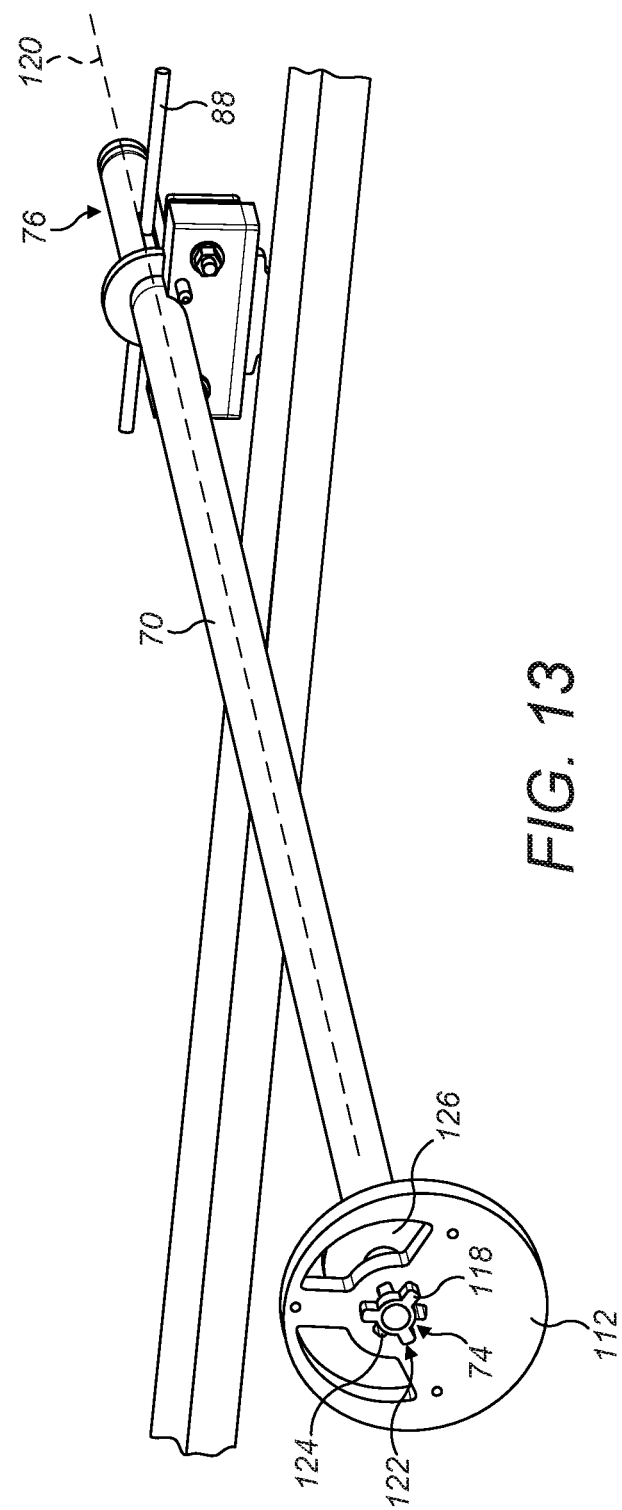
FIG. 13 shows an end of a bar attached to a plate.

As shown in FIG. 13, the fixed end 74 of the bar 70 comprises a plurality of lobes 118 that protrude from the fixed end 74 in a radial direction that is generally perpendicular to a longitudinal axis 120 of the bar 70. In this example, there are three radially-projecting lobes 118, which are equally spaced about the longitudinal axis 120 of the bar 70. Accordingly, an angle of approximately 120 degrees is defined between adjacent lobes 118.

The plate 112 comprises a central hole 122. A plurality of notches 124 extend from a periphery of the hole 122. The notches 124 extend radially, with respect to a centre of the hole 122. The notches 124 correspond in shape to the shape of the lobes 118 at the fixed end 74 of the bar 70. Accordingly, in this example, there are three notches 124. The notches 124 are equally spaced about the centre of the hole 122, such that the angle between adjacent notches 124 in this example is approximately 120 degrees.

The fixed end 74 of the bar 70 forms a twist-lock with the plate 112. When connecting the bars 70 to the shear web 16, the operator turns the handle 88 of the bar 70 so that the lobes 118 at the fixed end 74 align with the notches 124 in the plate 112. The operator then pushes the fixed end 74 of the bar 70 through the notches 124 and turns the bar 70 slightly, in this case by approximately 60 degrees. This causes the lobes 118 to become offset from the notches 124 such that the fixed end 74 of the bar 70 is then locked to the plate 112.

The bars 70 and plates 112 may exert a clamping force on the shear web 16. It can be seen in FIG. 13 that the fixed end 74 of the bar 70 includes a flange 126. The flange 126 is located on the opposite side of the web panel 26 to the plate 112 when the bars 70 are attached to the shear web 16. The flange 126 abuts the surface of the web panel 26 on the leading-edge side 116 of the panel 26 (in this example). A clamping force may be exerted on the web panel 26 between the flange 126 on one side of the web panel 26 and the plate 112 on the other side of the web panel 26.

Referring still to FIG. 13, in order to remove the bars 70 from the shear web 16, the bars 70 may be turned (e.g. approximately 60 degrees in this example) to align the lobes 118 again with the notches 124. This unlocks the twist-lock mechanism and allows the fixed ends 74 of the bars 70 to be detached from the plates 112 and pulled back out of the holes 36 provided in the web panel 26. As shown schematically in FIG. 8, the free ends 76 of the bars 70 project through the gap 102 between the upper and lower half moulds 100, 38 when the mould assembly 46 is partially closed. The handles 88 (see FIG. 13) at the free ends 76 of the bars 70 therefore remain accessible to operators and allow operators to turn these handles 88 to release the fixed ends 74 of the bars 70 from the plates 112.

Whilst the plates 112 may be permanently attached to the shear web 16, in other embodiments the plates 112 may be removable from the shear web 16. For example, the plates 112 may not be fixed to the web panel 26 in other examples. In such cases, the plates 112 may release, e.g. drop down from the web panel 26 when the bars 70 are detached from the shear web 16.

The plates 112 may each be connected to a cord or wire, which extends to the open root end of the blade assembly. Accordingly, when the plates 112 drop down they can be removed from the blade assembly simply by pulling the cord. This is a convenient method of removing/retrieving the plates 112, and allows the plates 112 to be removed without an operator having to enter the confined cavity 99 (see FIG. 8) between the shells 12, 14. Once removed, the plates 112 can be re-used for subsequent blades. Re-usable plates 112 provide a cost advantage and a weight saving in the finished blade.

Whilst in the embodiments described above, the blade 10 contains a single shear web 16, in other embodiments the blade 10 may contain multiple shear webs. For example, the blade 10 may include an additional trailing-edge web. A trailing edge web may be designed to provide additional support for the trailing edge of the blade 10, and may be suitable for relatively wide blades, i.e. blades having a large chordwise dimension. A plurality of bars may be used to support a trailing-edge web. The bars may be similar to the bars 70 previously described, and may be attached to the trailing-edge web in substantially the same way as the bars 70 attach to the main web 16. As a trailing edge web is located relatively close to the trailing edge 24, these bars may advantageously extend horizontally from a trailing-edge side of the trailing-edge web, and engage with a plurality of mounts attached to a trailing-edge side of the mould assembly 46.

The use of bars 70 to support shear webs 16 presents a number of advantages, many of which have already been discussed. In particular they avoid the need for large and expensive jigs to support the shear web 16, and thus present a significant cost saving over previous solutions. The factory floor space occupied by such jigs is also saved. The bars 70 can be stored outside the factory if required and occupy relatively little space. The bars 70 enable a one-stage join-up process to be used, which is not possible when using jigs. Accordingly, the takt time of the process is significantly reduced, resulting in higher utilisation of the moulds and allowing more blades to be produced on an annual basis. As the bars 70 are removed prior to compressing the adhesive 96, 106, the shear web 16 is unconstrained during the bonding process, allowing the shear web 16 to adopt a precise position relative to the blade shells 12, 14 in accordance with design specifications, leading to high-quality bond lines 108, 110 between the shear web 16 and the blade shells 12, 14.

Many modifications may be made to the examples described above without departing from the scope of the present invention as defined in the accompanying claims. Some examples of such modifications are briefly discussed below.

In other embodiments, any suitable means of attaching the bars 70 to the shear web 16 may be used. For example, the bars 70 may be configured to engage with attachment points provided on the side of the web panel 26 from which the bars 70 extend (e.g. on the leading-edge side of the web panel 26). The bars therefore do not need to extend through the shear web, such that the need for holes 36 in the shear web 16 and the associated plates 112 may be avoided. In certain embodiments, for example, the bars 70 may be configured to hook onto attachment points of the shear web 16. For example, the bars 70 may comprise a hook at one end for engaging an eyelet or other attachment point on the shear web 16.

Whilst in the above examples, the second half shell 14 is positioned above the first half shell 12 during mould closing, in other examples the first half shell 12 could be positioned above the second half shell 14. In such embodiments, the shear web 16 supported by the bars 70 may be lifted and turned together with the first half shell 12. In other words, the shear web 16 may thus be fixed relative to the upper half shell 14 before it is positioned relative to the lower half shell 12. Accordingly, in any embodiment, the first half shell 12 may be one of a windward or a leeward half shell, and the second half shell 14 may be the other of the windward or leeward half shell.

Whilst a one-stage join-up has been described by way of example, the bars 70 could alternatively be used to support the shear web 16 during a two-stage join up in which the shear web 16 is first bonded to the first half shell 12 before being bonded to the second half shell 14.

In the above examples the bars 70 extend from the leading-edge side of the main shear web 16 and beyond the leading edge 22 of the first half shell 12. This is advantageous for the blade 10 shown since the main shear web 16 is located closer to the leading edge 22 than to the trailing edge 24, especially near the root of the blade 10, and hence shorter bars 70 can be used in comparison to if bars were attached on the trailing-edge side of the web 16. However, in other examples the bars 70 could extend from the trailing-edge side of the main shear web 16 and over the trailing edge of the first half shell 12. Alternatively, bars 70 may be provided on both sides of the shear web 16 if required.

Whilst in the above examples the bars 70 are attached to the shear web 16 before the shear web 16 is lifted into the first half shell 12, in other examples the bars 70 may be attached to the shear web 16 after the shear web 16 has been arranged in the first half shell 12. For example, the shear web 16 may be lifted into the first half shell 12 and the bars 70 may then be attached to the shear web 16 whilst the shear web 16 remains supported by the lifting tool.

Any suitable number of bars 70 may be used. Whilst several bars 70 and mounting points 36 have been illustrated in the specific examples, in practice it has been found that the web 16 may be suitably supported with as few as three to five bars 70.

Whilst the bars 70 are preferably spaced at regular intervals along the shear web 16, any suitable spacing between bars 70 may be adopted, including irregular spacing.

In other examples, a more simplified lifting tool may be used. For example, a simple lifting beam may be used omitting the support framework 60 and legs 62. Whilst lifting jacks 78 are described in the above examples, these may not be required in practice, in particular when using a simplified lifting tool. Instead, the shear web 16 may simply be lowered into the first half shell 12 by any suitable lifting apparatus, for example by an overhead crane.

Whilst the mounts 80 in the above examples are attached to the mould assembly 46, in other examples the mounts 80 could be provided separately from the mould assembly 46.

In embodiments utilising a second shear web, such as a trailing-edge web, the second web may be connected to the first shear web 16, for example by spacer bars to increase the stability of the two webs.

The invention claimed is:

1. A method of making a wind turbine blade comprising first and second half shells and a shear web adhesively bonded between opposed inner surfaces of the half shells, the method comprising the following steps in any suitable order:

providing first and second half shells of the blade, each half shell extending in a spanwise direction between a root end and a tip end and extending in a chordwise direction between a leading edge and a trailing edge, wherein a first shear web mounting region is defined on an inner surface of the first half shell and a second shear web mounting region is defined on an inner surface of the second half shell;

providing a plurality of web flange locators in the second shear web mounting region;

providing a longitudinally-extending shear web comprising a web panel disposed between first and second mounting flanges;

providing a plurality of bars each extending between a fixed end and a free end, the fixed ends of the bars being attached to the shear web such that the bars project from the shear web in a direction transverse to the web panel;

providing a plurality of mounts respectively in a plurality of fixed locations relative to the leading and/or trailing edge of the first and/or second half shell;

arranging the shear web in the first half shell such that the first mounting flange is located in the first shear web mounting region, with adhesive being provided between the first mounting flange and the inner surface of the first half shell;

engaging the bars respectively with the plurality of mounts such that the bars support the shear web substantially vertically in the first half shell;

arranging the half shells one above the other such that one of the half shells becomes an upper half shell and the other half shell becomes a lower half shell and such that mutually opposed leading and/or trailing edges of the first and second half shells are spaced apart vertically to define a gap therebetween through which the bars extend such that the free ends of the bars are accessible outside the opposed half shells;

locating the second mounting flange of the shear web in the plurality of web flange locators, with adhesive being provided between the second mounting flange and the inner surface of the second half shell;

detaching the bars from the shear web; and lowering the upper half shell onto the lower half shell to close the gap between the two half shells and to compress the adhesive between the shear web mounting flanges and the half shells.

2. The method of claim 1, further comprising providing a plurality of web flange locators in the first shear web mounting region and locating the first mounting flange of the shear web in these web flange locators.

3. The method of claim 1, wherein the first and second half shells are supported respectively in first and second mould halves of a blade mould assembly.

4. The method of claim 3, wherein the mounts are attached to the first or second mould half.

5. The method of claim 1, wherein the bars extend substantially horizontally between the shear web and the mounts.

6. The method of claim 1, further comprising attaching the fixed ends of the bars respectively to a plurality of plates provided on an opposite side of the web panel to the free ends of the bars.

7. The method of claim 6, wherein the plurality of plates are each connected to a cord and the method comprises removing the plates from a cavity defined between the upper and lower half shells after the bars are detached by pulling the cord.

* * * * *